United States Patent [19]

Dyer

[11] Patent Number: 4,705,831

[45] Date of Patent: Nov. 10, 1987

[54] SHAPED STRUCTURE OF POLYAMIDE TREATED WITH UNSATURATED MONOMER TO EFFECT SINGLE MONOMER UNIT ADDITION BRANCH

[75] Inventor: Michael E. Dyer, Cleveland, Tenn.

[73] Assignee: Intera Corporation, Cleveland, Tenn.

[21] Appl. No.: 803,233

[22] Filed: Dec. 2, 1985

Related U.S. Application Data

[60] Division of Ser. No. 579,801, Feb. 17, 1984, Pat. No. 4,563,507, which is a continuation-in-part of Ser. No. 128,062, Mar. 7, 1980, abandoned.

[51] Int. Cl.$^4$ .............................................. C08G 69/48
[52] U.S. Cl. ................................... 525/426; 8/128 R; 528/345; 536/69
[58] Field of Search ....................... 525/426; 528/345; 536/69; 8/128

[56] References Cited

U.S. PATENT DOCUMENTS

| | | | |
|---|---|---|---|
| 4,563,507 | 1/1986 | Dyer | 528/345 |
| 4,595,730 | 6/1986 | Blondel et al. | 525/426 |

Primary Examiner—Harold D. Anderson
Attorney, Agent, or Firm—Oblon, Fisher, Spivak, McClelland, & Maier

[57] ABSTRACT

A method is provided for treating and modifying solid, high molecular weight Lewis base polymers, particularly shaped structures such as fibers, filaments or knitted fabrics, to form branched polymer with improved electrical conductivity, water absorbency and dye receptivity while retaining the essential structural shape. The method comprises heating the polymer in the presence of an aqueous treating solution containing an ethylenically unsaturated monomer which does not readily polymerize under the conditions of treatment and a catalyst which is a source of hydrogen ions or protons. The treatment is carried out at a temperature and for a sufficient time so as to effect essentially single molecule addition of the monomer pendent to the polymer chain with substantially no graft polymerization of the monomer to the polymer. A particularly preferred embodiment of the method is the treatment of nylon 6,6 knitted fabric with an aqueous solution of acrylamide and hydrochloric acid for about one hour at 95° C. to 100° C.

5 Claims, No Drawings

SHAPED STRUCTURE OF POLYAMIDE TREATED WITH UNSATURATED MONOMER TO EFFECT SINGLE MONOMER UNIT ADDITION BRANCH

CROSS-REFERENCE TO RELATED APPLICATION

This is a division of application Ser. No. 579,801, filed Feb. 17, 1984, now U.S. Pat. No. 4,563,507 which is a continuation-in-part of patent application Ser. No. 364,045, filed Mar. 31, 1982, now abandoned, which is a continuation-in-part patent application Ser. No. 128,062, filed Mar. 7, 1980, now abandoned.

BACKGROUND OF THE INVENTION

The present invention relates to the treatment of Lewis base containing polymers to improve the antistatic, hygroscopic and dye receptive properties of the polymer structure. More particularly, the invention is directed to the modification of Lewis base polymers by means of an aqueous treating solution to form branched polymers with improved properties while retaining the essential structural shape of the polymer.

It has been known in the prior art to graft-polymerize water-soluble polymers such as acrylic acid, acrylamide and N,N'-methylene-bis-acrylamide onto fibers to impart antistatic and water absorption properties to the fibers. However, such graft polymerization processes have been problematical due to difficulties in controlling the process conditions and the tendency to form large amounts of homopolymers which must be removed from the final product as well as the process equipment. Some of these processes and the difficulties therewith are discussed in more detail at column 1 of U.S. Pat. No. 4,135,877.

One patent which is representative of the prior art is U.S. Pat. No. 3,313,591 issued to David Tanner of E. I. duPont de Nemours and Company, which describes a process of graft polymerizing ethylenically unsaturated monomers to polycarbonamides to improve various properties of the polymer structure. According to that process, polymerization initiators were eliminated and heat was used as the sole graft initiator for producing the free radicals necessary for graft polymerization.

A more recent attempt to cure the deficiencies of the prior art is disclosed in U.S. Pat. No. 4,135,877 issued to Akira Aikawa et al. of Kanebo, Ltd. which discloses a process of graft polymerizing certain selected vinyl monomers to polyamide fibers or fibrous structures. According to the process described in that patent, polymerization initiators are eliminated and heat is used as in the Tanner method, but the aqueous treating solution also contains an acid.

Other patents disclosing the graft polymerization of monomers to polyamides and other polymer structures include U.S. Pat. Nos. 3,097,185; 3,099,631; 3,252,880 and 3,278,639. However, the methods of these patents involve the use of ionizing radiation or the formation of a polymer melt in order to effect the graft polymerization.

While many of these processes of the prior art result in improved antistatic, hygroscopic and dye receptive properties in the trunk polymer, they have not been entirely successful commercially due to the difficulties due to the simultaneous formation of homopolymers which are difficult to remove from the final product and the process equipment. Yet, the improvement of such properties of polymer fabrics is important since the characteristic static cling, poor water absorbency and poor dye receptivity of, for example, polyamides have limited the commercial acceptance of nylon fabrics.

DEFINITIONS

As used hereinafter, "Lewis base polymer" means a polymer which can furnish an election pair to form a covalent bond.

SUMMARY OF THE INVENTION

The above and other problems of the prior art are alleviated by the present invention wherein Lewis base polymers are modified by essentially single molecule additions of a monomer pendent to the polymer chains with substantially no graft polymerization of the monomer to the polymer. According to the invention, this modification of solid, high molecular weight Lewis base polymers is carried out by heating the polymer in the presence of an aqueous treating solution while retaining the structural shape of the polymer. The aqueous treating solution comprises an ethylenically unsaturated monomer which does not readily polymerize under the treating conditions and a catalyst which is a source of hydrogen ions or protons. The resulting polymer structures are branched and have substantially improved water absorbency, electrical conductivity and dye receptivity.

A particularly preferred treating solution contains acrylamide as the monomer and hydrochloric acid as the catalyst and a treating temperature of about 95° C. to about 100° C. for about 1 hour. The process is carried out without the necessity of any polymerization initiators such as persulfates, peroxides, or ionizing radiation, but polymerization inhibitors may be desirable or necessary depending upon the particular monomer used. The polymer structure may be in any desired form such as fibers, filaments, knitted fabric, etc. Moreover, the process may be carried out at any stage in the processing of a polymer fabric, such as before, during or after scouring, but preferably not later than the dyeing stage.

DETAILED DESCRIPTION OF THE PREFERRED EMBODIMENTS

The polymers to which the present invention is directed are the high molecular weight Lewis base polymers which are solid at temperatures between about 15° C. and about 100° C. Flakes, fibers, fabrics and the like are particularly suitable forms of the shaped polymer structure. As used herein, the term "solid" will be understood to mean any unmelted form of the polymer.

A Lewis base is a substance that can furnish an electron pair to form a covalent bond. A Lewis base is thus an electron-pair donor. Non-limiting examples of Lewis bases include amine groups

and hydroxy groups (—O—H).

Polymers for use in the present invention include both natural and synthetic polymers. Non-limiting examples of natural polymers suitable for being treated according to the present invention include wool, cotton and silk. Non-limiting examples of synthetic polymers suitable for being treated according to the present invention include nylon, acetate and cellulosic fibers, e.g., rayon. Non-limiting examples of polymer fibers containing an amine (—NH or —NH$_2$) group include nylon 6,6, nylon 6, wool and silk. Non-limiting examples of polymer fibers containing a hydroxy (—OH) group include cotton, rayon and acetate.

The present invention is not, however, directed to fibers which do not contain a Lewis base, such as conventional polyesters and conventional acrylics, e.g., "ORLON" fibers. This, however, does not exclude potential unconventional fibers, i.e., new polyesters and acrylics.

Preferred polyamides for use in the present invention are the synthetic linear condensation polyamides containing a carbonamide unit as a linking unit in the main polymer chain. Such polyamides include, for example, poly (hexamethylene adipamide), which is prepared by the well known reaction of a polycarboxylic acid such as adipic acid (or an amide-forming derivative thereof) with a polyamine such as hexamethylene diamine. The most common commercially available polyamides of this type in the United States are nylon 6,6 which is polyhexamethylene adipamide, and nylon 6 which is poly-caprolactam. These types of nylons are commonly extruded as monofilaments over a wide dimensional range, oriented by cold-drawing and knitted into many different forms of fabrics.

The monomers which may be attached to the polymer chains according to the present invention are those which have at least one carbon-carbon double bond resulting in attachment to the polymer chains, but without the formation of graft polymers or homopolymers of the monomer. These monomers may be selected from the general class of ethylenically unsaturated or vinyl monomers of the formula $CX_2=CX_2$ wherein X selected from the group consisting of hydrogen, organic radicals and inorganic radicals, with at least one of the X groups being other than hydrogen.

Examples of suitable monomers useful in the present invention include acrylamide, acrolein, allyl alcohol, protonic acid, methacrylic acid, maleic acid, sorbic acid, 2-butene-1, 4-diol, chloroethylene, etc. Acrylamide has been found to be particularly successful in carrying out the present invention.

The catalysts useful in the present invention are water soluble acids which do not adversely affect the polymer or the monomer, but which provide a source of hydrogen ions or protons in the treating solution. The acid need not be a strong acid, and some effect is even obtained with distilled water as shown in the specific examples set forth below. Although applicant does not wish to be bound by any particular theory, it is believed that the acid catalyst assists in opening upon the carbon-carbon double bond.

Examples of suitable acid catalysts for use in the present invention include hydrochloric, phosphoric, sulfuric, nitric, acetic, formic, oxalic, tartaric, monochloroacetic, dichloroacetic, trichloroacetic and similar acids. Hydrochloric acid has been found to be particularly suitable in carrying out the present invention.

Although it is particularly preferred that the treating solution be aqueous due to the ready solubility of the monomers and acid catalysts, other solvents besides water, such as methanol or other alcohols could be used. However, water also avoids the problems associated with disposal and recovery of organic solvents.

Besides the monomer and acid catalyst, no other ingredients are normally necessary in the treating solution according to the present invention. Thus, since graft polymerization is to be avoided, it is not necessary to add any polymerization initiators, and the acid and heat are normally sufficient to induce the cleavage of the carbon-carbon double bond. Moreover, in the case of acrylamide and other monomers having an amine group which inherently acts as an inhibitor to polymerization, it is also not normally necessary to use a polymerization inhibitor in the treating solution. While applicant does not wish to be bound by any particular theory, it is believed that the acid may also act as a polymerization inhibitor as well as catalyst for the reaction. However, with some monomers which more readily polymerize, it may be necessary to include in the treating solution one or more polymerization inhibitors, which are known in the art for the particular monomer selected.

The particular concentrations of the monomer and acid catalyst in the treating solution will vary widely depending upon such factors as the nature of the particular monomer and/or catalyst, the time and temperature of treatment, the nature and form of the polymer, etc. While these concentrations may be fairly critical for a particular monomer and/or catalyst under a given set of treating conditions, applicant cannot give general ranges which would apply to all monomers and/or catalysts under all conditions, but those of ordinary skill in the art will be able to optimize the concentrations by routine experimentation on the basis of the present disclosure.

In the case of the preferred embodiment wherein the monomer is acrylamide and the catalyst is hydrochloric acid, an acrylamide concentration of about 0.5 to about 7.0 percent by weight of the solution, and preferably about 2.0 to about 4.0 percent by weight is suitable. Similarly, a suitable concentration for the hydrochloric acid is about 0.5 to about 10 percent by weight of the solution, and preferably about 0.5 to about 3.0 weight percent.

Treating times and temperatures will also vary widely depending upon various factors, including the nature and concentration of the monomer and/or acid. Generally, temperatures in the range of about 50° C. to about 100° C. are suitable, and temperatures above the boiling point of the treating solution are undesirable. In any event, the temperature should not be so high as to melt or otherwise deteriorate the structural shape of the polymer solid.

However, consistent with the avoidance of graft polymerization and retention of the essential structural shape of the polymer, it is preferred to use as high a temperature as possible below the boiling point of the solution in order to minimize the required time of treatment. Hence, where the monomer is acrylamide and the acid is hydrochloric, a treating temperature of about 95° C. to about 100° C. is preferred. At this temperature, the treatment may be carried out satisfactorily in about one hour. Of course, with higher concentrations of acrylamide and hydrochloric acid, lower treatment temperatures and/or shorter treatment times may be possible, but such modifications will be obvious to those skilled in the art from routine experimentation based upon the present disclosure.

Those of ordinary skill in the art will recognize that the proper extent of treatment can be determined by detecting the onset of homopolymerization of the monomer in the treatment solution. That is, since graft polmerization is normally accompanied or preceded by homopolymerization of the monomer, which appears as a precipitate or cloudiness in the treatment solution, the formation of homopolymers should be avoided. Of course, while the present invention seeks to obtain essentially single molecule additions of the monomer to the polymer chains, it will be understood that there will inevitably be some amounts of graft dimerization and/or trimerization on the polyamides and in the treatment solution. Theoretically, there should be a maximum addition of one molecule to every six units of the polymer chain in the case of nylon 6,6 or nylon 6. However, accurate determinations of the exact numbers of additions are difficult on a simple weight basis since nylon picks up about 5 percent water, and the total addition of monomer to polymer is generally too small to measure, and in one case was measured as less than 0.03 percent by weight.

The treatment process of the present invention may be carried out at any desired stage of the processing of the polymer structure and by any suitable means after the formation of the polymer solid to be treated. For example, in the case of the treatment of polymer filaments the treatment of the present invention may be carried out at any time from the drawing of the fibers to the completion of the finished product. For example, the treatment could be combined with one of the rinsing cycles for the filaments or the knitted fabric, or as a separate treatment before, during or after scouring of the filaments or fabric. Preferably, the treatment is carried out prior to the dyeing of the filaments or fabric in order to take advantage of the improved dye receptivity of the polymer as a result of the treatment.

While immersion of the polymer structure in the treating solution is most satisfactory in most instances, the treating solution may be applied to the polymer by spraying, padding or other suitable means. Similarly, while the application of heat is most easily carried out by heating the treating solution, radiant heaters, ovens or other means could be used to heat the polyamide.

The invention will now be described in greater detail by reference to the following specific, non-limiting examples:

EXAMPLES I TO V

Five different 700 ml solutions having the following compositions (see Table 1) were prepared in one liter glass beakers by dissolving the components in distilled water (all percentages being percentages by weight of the solution, unless otherwise indicated).

TABLE 1

| Solution No. | HCl | NaOH | Acrylamide | Water |
|---|---|---|---|---|
| I | 3% | 0% | 2.85% | 94.15% |
| II | 3% | 0% | 0% | 97% |
| III | 0% | 0% | 2.85% | 97.15% |
| IV | 0% | 2.85% | 2.85% | 94.3% |
| V | 0.53% | 0% | 2.85% | 96.62% |

A sixth beaker (sample VI) containing distilled water only was used for comparison or control purposes.

Into each beaker of solution was placed a 20 gram (±2 gram) sample of nylon 6,6 scoured and heat set fabric that was single knitted with continuous multi-filament yarn having a total denier of 70, with 24 filaments and having a weight of 121 grams per square meter. Each solution was preheated and kept at a constant temperature range of between about 95° C. and about 100° C. for sixty minutes. The fabric samples were then removed from each solution and climatized for at least 12 hours at 55% (±5%) relative humidity and room temperature.

The six samples were then subjected to the following tests:

Drop Test

A common medicine dropper was used to drop one drop of distilled water onto the fabric sample from a height of about ⅛ inch above the fabric. Two minutes after the water was dropped on the fabric sample, comparative observations were made as to the interaction between the fabric and the water. Two criteria were used to judge the water absorption of the fibers, namely (1) the area of the fabric which is "wetted" by the drop of water and (2) the ability of the fabric to absorb the water into the individual fibers. The results of the drop test for Example Nos. I to VI are set forth below in Table 2.

TABLE 2

| Example No. | Drop Test Observations |
|---|---|
| I | Drop spreads to a 14 mm diameter and some water can still be seen between the fibers. |
| II | The drop beads on the fabric. |
| III | Drop spreads to a 15 mm diameter and some excess water can be seen between the fibers. |
| IV | Drop spreads to a 9 mm diameter and excess water can be seen between the fibers. |
| V | Drop spreads to a 22 mm diameter and no water is seen outside of the fibers. |
| VI | The drop beads on fabric. |

Resistivity Test

Each sample was placed between two flat polished metal plates, with the area of fabric between the metal surfaces being 10.45 square centimeters. No pressure was applied except that of the top metal place which weighs no more than 1 kilogram. Resistivity was measured with a model 603-type two Triplett meter using 1.5 volts and 56 milliwatts. The readings for each sample are set forth below in Table 2.

TABLE 2

| Example No. | Resistivity Readings |
|---|---|
| I | 1000 million ohms |
| II | infinite ohms |
| III | infinite ohms |
| IV | infinite ohms |
| V | 1000 million ohms |
| VI | infinite ohms |

Dye Test

Each sample was placed in a 3 liter dye bath (preheated to 185° F.) containing 0.033 grams/liter levalan red dye in distilled water for a period of two minutes. After removal of the samples from the dye bath and air drying, the dye receptivity was observed and judged on a scale of 1 to 10 where 1 is light pink and 10 is bright red. The results of the dye test are set forth below in Table 3.

TABLE 3

| Example No. | Dyeing Observation |
|---|---|
| I | 8 |
| II | 9 |
| III | 3 |
| IV | 1.5 |
| V | 7 |

TABLE 3-continued

| Example No. | Dyeing Observation |
| --- | --- |
| VI | 3 |

From the above test results, the samples of Examples I, III and V all had significantly improved hygroscopic properties. The sample of Example III, however, which did not have an acid catalyst in the treatment solution, still had poor electrical conductivity and poor dye receptivity. The sample of Example II had the best dye receptivity due to the treatment with acid alone, but electrical conductivity was still poor and the hygroscopic properties were not improved at all. Where a base (Example IV) was used, hygroscopic properties, electrical conductivity and dye receptivity were still poor. Note that although the water droplet spread out some rather than beading on the fabric, this was due to the loose knit of the fabric, and there was no observable absorption of the water by the filaments.

Only with Examples I and V, which involved treatment with heat and a solution containing acrylamide and hydrochloric acid, was there substantial improvement in all three of the properties tested. These examples concern two samples treated in accordance with the present invention so as to yield essentially single molecule addition of the monomer to the polymer chain, with substantially no graft polymerization.

Although the prefered practice of the present invention seeks to obtain essentially single molecule addition of the monomer to the polymer chains, the addition of dimers and trimers of the monomer is also satisfactory. Therefore, as used in the present specification and claims, the term "essentially single molecule addition" will be understood to include additions of single, double and triple molecules of the monomer to the polymer chains. Significant additions of anything larger than trimers would be considered graft polymerization and is therefore to be avoided.

EXAMPLES VII to IX

These examples demonstrate the position of addition of the monomer pendent to the polymer chains.

About 25 grams of scoured and rinsed nylon 6, 6 fabric was dissolved in 750 ml of reagent grade 88 percent formic acid. This solution was poured thinly on clean glass plates that were heated and dried. The result was a thin sheet of nylon 6,6 of about 12.5 grams per square meter. This gave us a sample nylon with more surface area to react in our process.

The nylon film was then treated according to the present invention with a solution of 20 percent acrylic acid at 85° C. to 93° C. for 32 minutes. Acrylic acid is not expected to polymerize at these conditions; but, for protection against polymerization, the 20 percent solution included three inhibitors of MEHO, namely, methylhydroquinone, 1 gram fumaric acid, and 5 ppm copper. This reaction was also carried out in an oxygen environment. After this treatment, the film was then rinsed and dried. To quantitatively determine the amount of a small portion of tertiary amines in the presence of primary and secondary amines a specific procedure was employed. Basically, this procedure involved the reacting of the primary and secondary amines with acetic anhydride and titrating the remaining tertiary amines with perchloric acid.

A solvent for titration was prepared using 90 percent phenol and 10 percent ethylene glycol monomethyl ether. The phosphoric acid in the phenol was neutralized with 25 percent sodium hydroxide.

Approximately 50 ml of this solvent was transferred into two flasks and one was reserved for a blank determination. Into the other flask was introduced about 1.5 grams of sample. Ten ml of acetic anhydride (99%) was added to each flask, swirled gently, and the blank and sample were allowed to stand for 30 minutes at room temperature.

One drop of 0.04% thymol blue was added and the contents of each flask were titrated with standard 0.1N perchloric acid. The difference between blank and sample titrations is a measure of the tertiary amine content.

Results for Example Nos. VII to IX are given below in Table 4.

TABLE 4

|  | Ex. No. VII no nylon | Ex. No. VIII nylon 6,6 | Ex. No. IX nylon 6,6 addition product |
| --- | --- | --- | --- |
| Initial reading | 23.63 | 24.23 | 24.85 |
| Final reading | 24.23 | 24.85 | 26.22 |
| Difference | 0.60 | 0.62 | 1.37 |
| % tertiary amines | 0% | 0% | 0.5% |

About 0.5% of the secondary amines in the nylon 6,6 were found to be tertiary. This indicates a reaction with the amine pendent to the polymer chain as opposed to merely reaction with the terminal ends of the polymer chain.

EXAMPLES X TO XVII

Different fabric samples were processed according to the general procedure of Examples I to V. For each processed fabric, the drop test was performed and measured in mm diameter of a drop spreading after thirty seconds (see general description of the drop test hereinabove). Resistivity was tested for each processed fabric through one square mm of fabric using a model CS-51 electrical resistance tester—Costom Scientific Instruments, Inc. (see general description of the resistivity test hereinabove).

Examples X, XII, XIV and XVI concerned treated samples such as the fiber of Example I. Examples XI, XIII, XV and XVII dealt with untreated samples such as the fiber of Example II. Drop test and resistivity test results for Example Nos. X to XVII are given below in Table 5.

TABLE 5

| Example No. | Fiber | Drop Test mm | Resistivity (meg ohms) |
| --- | --- | --- | --- |
| X | treated cotton | 31 | 25,000 |
| XI | untreated cotton | 27 | 975 |
| XII | treated wool | 7 | 255,000 |
| XIII | untreated wool | 5 | 8,125 |
| XIV | treated acetate | 15 | 525,000 |
| XV | untreated acetate | 12 | 600,000 |
| XVI | treated silk | 40 | 640,000 |
| XVII | untreated silk | 27 | 750,000 |

The present invention may be embodied in other specific forms without departing from the spirit or essential attributes thereof and, accordingly, reference should be made to the appended claims, rather than to the foregoing specification, as indicating the scope of the invention.

I claim:

1. A shaped structure of solid, high molecular weight polyamide polymer which has been treated with an ethylenically unsaturated monomer to effect the addition of the monomer pendant to the polymer chains to form a branched polymer with substantially no graft polymerization of said monomer to said polymer.

2. The shaped structure of claim 1, wherein said ethylenically unsaturated monomer is maleic acid.

3. The shaped structure of claim 1, wherein said polyamide polymer comprises nylon 6,6.

4. A textile fiber of the shaped structure of claim 1.

5. A knitted fabric of the shaped structure of claim 1.

* * * * *

UNITED STATES PATENT AND TRADEMARK OFFICE
CERTIFICATE OF CORRECTION

PATENT NO. : 4,705,831

DATED : NOVEMBER 10, 1987

INVENTOR(S) : MICHAEL E. DYER

It is certified that error appears in the above-identified patent and that said Letters Patent is hereby corrected as shown below:

```
Column 2, line 8, change "election" to --electron--.
Column 3, line 35, after "X" insert --is--.
Column 6, line 42, change "Table 2" to --Table 3--;
          line 43, change "Table 2" to --Table 3--;
          line 61, change "Table 3" to --Table 4--;
          line 62, change "Table 3" to --Table 4--.
Column 7, line 1, change "Table 3" to --Table 4--;
          line 29, change "prefered" to --preferred--;
          lines 56-57, change "methylhydroguinone" to
                      --methylhydroquinone--.
Column 8, line 15, change "Table 4" to --Table 5--;
          line 16, change "Table 4" to --Table 5--;
          line 49, change "Table 5" to --Table 6--;
          line 50, change "Table 5" to --Table 6--.
Column 9, line 4, change "pendant" to --pendent--.
```

Signed and Sealed this

Twenty-second Day of May, 1990

Attest:

HARRY F. MANBECK, JR.

*Attesting Officer*      *Commissioner of Patents and Trademarks*